United States Patent [19]

Terazawa

[11] Patent Number: 4,986,238
[45] Date of Patent: Jan. 22, 1991

[54] THROTTLE CONTROL SYSTEM
[75] Inventor: Tadashi Terazawa, Toyota, Japan
[73] Assignee: Aisin Seiki Kabushiki Kaisha, Kariya, Japan
[21] Appl. No.: 401,168
[22] Filed: Aug. 31, 1989
[30] Foreign Application Priority Data
  Aug. 31, 1988 [JP] Japan .................... 63-216753
[51] Int. Cl.⁵ .................. F02D 41/00; F02D 11/10
[52] U.S. Cl. ..................... 123/361; 123/399; 123/400; 180/197
[58] Field of Search ........... 123/342, 340, 361, 399, 123/400; 180/178, 179, 197

[56] References Cited
U.S. PATENT DOCUMENTS

| 4,703,823 | 11/1987 | Yogo et al. | 123/323 |
| 4,714,864 | 12/1987 | Yogo et al. | 180/197 |
| 4,750,582 | 6/1988 | Maas | 180/197 |
| 4,815,553 | 3/1989 | Onishi et al. | 180/178 |
| 4,821,831 | 4/1989 | Onishi | 180/178 |
| 4,823,902 | 4/1989 | Onishi et al. | 123/361 |
| 4,919,097 | 4/1990 | Mitui et al. | 123/361 |

Primary Examiner—William R. Wolfe
Assistant Examiner—Robert E. Mates
Attorney, Agent, or Firm—Burns, Doane, Swecker & Mathis

[57] ABSTRACT

A throttle control system for an engine of a vehicle provided with an acceleration slip control system and a constant speed running hold system which includes an output member for driving the throttle valve and connected to the accelerator. An actuator connecting member controls the output member and a control system detects and discriminates the operational position, constant speed running mode and operation of the actuator, respectively. Opening of the throttle valve due to erroneous operation of the control system can be prevented.

7 Claims, 5 Drawing Sheets

THROTTLE CONTROL SYSTEM

BACKGROUND OF THE INVENTION

1. Field of the Invention

The present invention relates to a throttle control system of an engine for use in the throttle opening control system for a vehicle, for example, such as acceleration slip control system, constant running hold system, idling control system, automatic speed control system and fuel cost control system.

2. Description of the Related Art

Japanese patent laid open publication No. Sho-61-272423 discloses a throttle control system for a vehicle combining a constant running hold system and an acceleration slip control system. This system comprises an input member being reciprocated around a pivot axis by an accelerator control means. An output member drives a throttle valve by being reciprocated around a coaxial pivot axis by an actuator and includes an intermediate member for transmitting reciprocation of the input member to the output member by reciprocating around the coaxial pivot axis, and a spring arrangement for connecting the output member and the intermediate member. The throttle valve is manually operated by the accelerator operator, at the same time, the accelerator operator is driven by the actuator in constant speed running mode and acceleration slip control mode.

However, the aforementioned conventional throttle control system employs a complicated mechanism in order to restrict the throttle valve opening and closing operation for constant speed running control and throttle valve closing operation for acceleration slip control which may simultaneously function by operational error.

The aforementioned actuator is provided with two parallel operating arrangements with each set including speed reducing a mechanism and an electromagnetic clutch as well as a one way clutch. Each speed reducing mechanism is driven by a common motor, and a common output member is driven by each of the one way clutches It is constructed so as to connect the respective electromagnetic clutches during acceleration slip control and constant speed running control. Use of such complicated actuator mechanisms has increased the likelihood of failure in addition to the problem of manufacturing costs.

SUMMARY OF THE INVENTION

Therefore, it is an object of the present invention to provide a throttle control system having a simple structure with error free operation.

A throttle control system includes an output member for driving a throttle valve, an accelerator connecting member for driving an output member and operated by the accelerator operator, an actuator connecting member driven by an actuator and driving the output member while in the constant speed running mode and slip control mode. The control system discriminates the constant speed running mode by detecting the operational position of the actuator connecting member and restricting the operation of the throttle valve opening to a predetermined direction when in a state other than the constant speed running mode.

Further, a predetermined portion (operating position) of the accelerator connecting member or the actuator connecting member is structured so as to be different during the constant speed running mode and the acceleration slip control mode.

The actuator operates the throttle valve mechanically without depending on the manual operation by the accelerator operating means. For example, it may be structured by a motor or a motor having an electromagnetic clutch. The actuator may be connected directly to the output member, or it can be also connected to the output member through a second input member for the torque transmission.

The control system includes a detecting means for detecting the operational position of each element from the output end of the actuator to the throttle valve, a discriminating means for discriminating whether or not the detected operational position is present within the range of operational region during the constant speed running mode, and a restricting means for restricting the operation of the actuator in a direction of the throttle valve opening except at least during the constant speed running mode. For example, a limit switch can be employed as a simple control system.

An encoder or potentiometer and the like may be used for detecting the movement of the output member or actuator connecting member and a CPU may be used as a discriminating means. A control circuit may be employed for restricting the power supply for the motor or for releasing the electromagnetic clutch.

The control system detects the operational position of the actuator connecting member being driven by the actuator, so as to discriminate whether or not the operational position is present within the operational region capable of executing the constant speed running mode. If the operational position is present other than the operational region (for example, an operational region of acceleration slip control mode separately provided from the operational region of constant speed running mode) capable of executing the constant speed running mode, operation of the actuator in a direction of the throttle valve opening is restricted.

Therefore, according to the throttle control system of the present invention, the opening of the throttle valve in a mode other than the constant speed running mode, for example, such as acceleration slip control mode and the like is prevented and any errors which might otherwise occur for opening of the throttle valve due to electromagnetic wave interference can be prevented.

DETAILED DESCRIPTION OF THE PREFERRED EMBODIMENTS

A preferred embodiment of the throttle control system of the present invention having a hold system for constant speed running and an acceleration slip control system will be described in detail with reference to FIG. 5.

Figure 5:
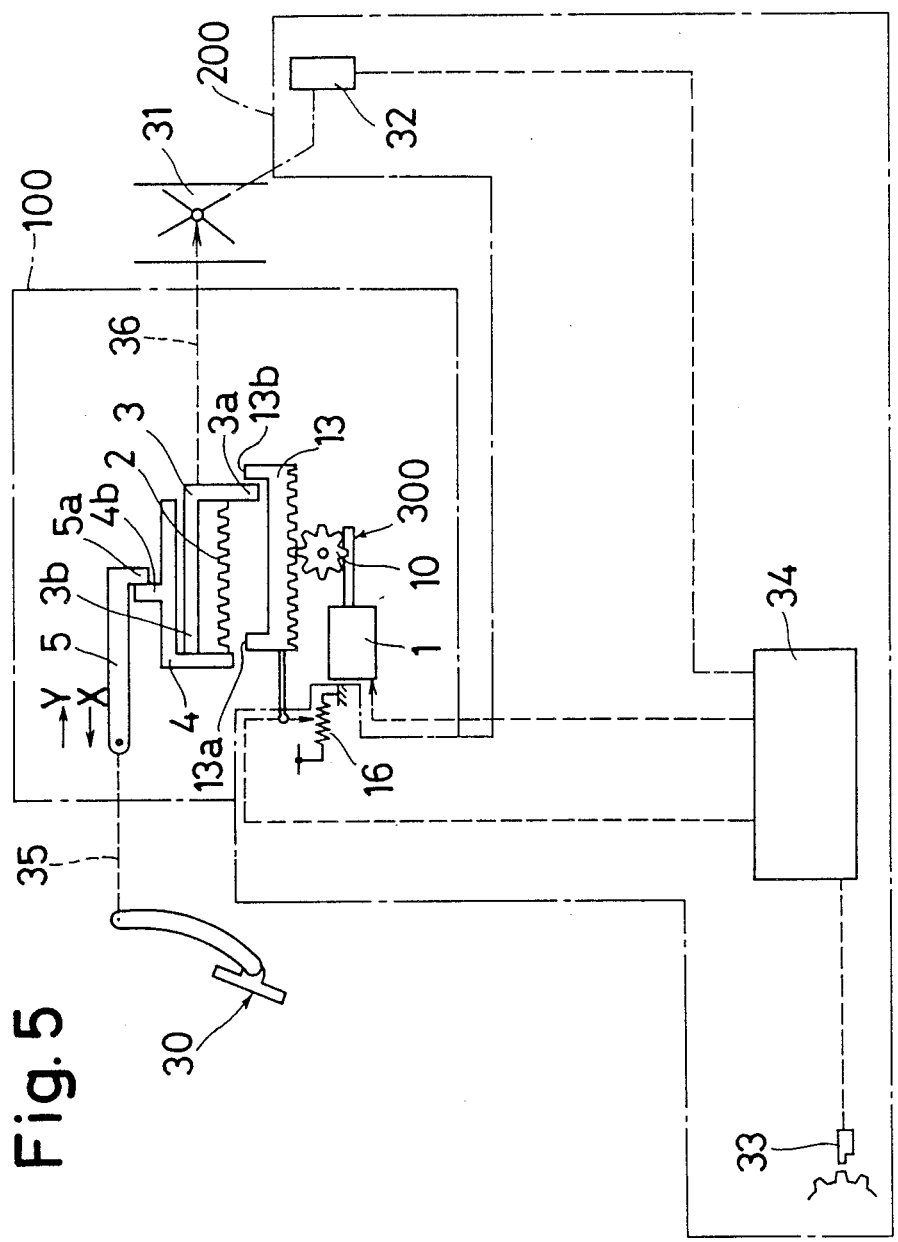
FIG. 5 is a schematic diagram explaining the operation of a throttle control system of a first embodiment of the present invention.

The throttle control system shown in FIG. 5 includes a throttle control mechanism 100 for controlling the throttle valve 31 and connected to an accelerator pedal 30 and the throttle valve 31. An electronic controller 200 controls the throttle control mechanism.

The throttle control mechanism 100 includes an input member 5 connected to the accelerator pedal 30 by a wire or linkage 35 and being capable of reciprocating movement between an X direction and an opposite Y direction. An intermediate member 4 is movable in the X direction by the urging force of input member 5. An output member 3 is capable of moving in the X direction by the urging force of the intermediate member 4 and is connected to the throttle valve 31 by the wire or linkage 36. A holding spring 2 connects the intermediate member 4 and the output member 3. A second input member 13 is engageable with the output member 3 so as to move member 3 in the X and Y direction. An actuator 300 moves the second input member 13 in the X and Y direction.

The input member 5 and the intermediate member 4 constitute the accelerator connecting member of the present invention, and the input member 13 constitutes the actuator connecting member.

The input member 5 has a protrusion 5a capable of abutting with a protrusion 4b of the intermediate member 4 so as to move the intermediate member 4 in the X direction upon actuation or depression of the accelerator pedal 30.

The actuator 300 includes a motor 1, a worm wheel 10 for meshing with a gear formed on the output shaft 1a at one end of the motor 1, and an electromagnetic clutch (not shown in FIG. 5) disposed within the worm wheel 10. The worm wheel 10 and shaft 1a constitute a rack and pinion mechanism, with the second input member 13 driven by the worm wheel 10 through the connection of the electromagnetic clutch so as to be movable in the X and Y directions.

The output member 3 has a protrusion 3a, and the protrusion 3a is positioned for movement between the protrusions 13a, 13b of the second input member 13. That is to say, the input member 13 is such that the protrusion 13a moves the protrusion 3a in the Y direction, and the protrusion 13b moves the protrusion 3a in the X direction by the movement of second input member 13. The protrusions 13a, 13b extend between a predetermined interval, and the input member 13 is arranged so as not to move the output member 3 until the protrusion 3a is contacted by the protrusion 13a in its movement through the predetermined interval.

The control means 200 comprises a vehicle wheel speed sensor 33 for detecting the rotational speed of a driving wheel and following or driven wheel, throttle sensor 32 for detecting the throttle valve opening, potentiometer 16 which is connected to the second input member 13 for detecting its position, and control unit 34 which receives the signal of each sensor 32, 33 and potentiometer 16 so as to control the motor and the electromagnetic clutch.

Hereinafter, the operation of the throttle control system will be described in detail. The constant speed control is an automatic control method for movement at a predetermined vehicle speed (speed control), and acceleration slip control is an automatic control method for reducing the throttle valve during acceleration slip. Their detailed explanation will not be described as both are well known.

If the constant speed running control or the acceleration slip control is not operational, due to the constant speed running switch and slip control switch (not shown) being turned off, the electromagnetic clutch is not actuated and the connection between the worm wheel 10 and second input member 13 is released and the throttle valve 31 is operated only by the accelerator pedal 30. Accordingly, when stepping on the accelerator pedal 30, the input member 5 and the intermediate member 4 are moved in the X direction, the intermediate member 4 moves the output member 3 in the X direction through the urging force of the holding spring 2 and the output member 3 opens the throttle valve 31. When returning the accelerator pedal 30, the output member 3, intermediate member 4, and input member are returned by a returning spring (not shown).

When turning the constant speed running switch ON and when setting a desired or predetermined car speed in the control unit 34, the electromagnetic clutch is energized for the constant speed mode. The second input member 13 can then be driven by the worm wheel 10. The control unit 34 detects the actual vehicle speed from the signal of the vehicle wheel speed sensor 33 and controls the motor 1 so that the detected actual vehicle speed is maintained at substantially the predetermined vehicle speed.

That is to say, if actual vehicle speed<predetermined vehicle speed, the control unit 34 moves the second input member 13 in the X direction, thereby moving the output member in the X direction due to the abutment of the protrusions 13b, 3a, and the throttle valve opening is increased. If actual vehicle speed>predetermined vehicle speed, the control unit 34 moves the second input member 13 in the Y direction, and the opening of the throttle valve 31 is decreased by the returning spring.

In the constant speed running ;mode, when the accelerator pedal 30 is depressed to a degree corresponding to a throttle valve opening greater than the predetermined vehicle speed, the output member 3 moves further in the X direction through the input member 5, intermediate member 4 and holding spring 2, the throttle valve 31 is opened to a degree greater than the opening for the constant speed running.

When the slip control switch is turned ON, the electromagnetic clutch is similarly energized, and the second input member 13 is movable by the worm wheel 10. When the car wheel speed sensor 33 discriminates or detects a difference in the rotational speed between the driving wheel and the following or driven wheel which exceeds a predetermined value, i.e., slip, the control unit 34, acting through the motor 1, rotates the worm wheel 10 to move the second input member 13 in the Y direction. The protrusion 13a of second input member 13 abuts the protrusion 3a of the output member 3 and moves it in the Y direction, decreasing the opening of throttle valve 31. Actual opening degree of the throttle valve 31 is detected by the throttle sensor 32, and the control unit controls the motor 1 so that the actual opening degree of the throttle valve is decreased to the calculated opening degree.

When the output member 3 is moving in the Y direction due to the acceleration slip control, even if the accelerator pedal 30 is actuated, the holding spring 2 for connecting the intermediate member 4 with the output member 3 is only extended. Accordingly, the output member 3 is not moved in the X direction, and the throttle valve 31 is not opened. Any shock due to displacement of the output member 3 in the Y direction is absorbed by the holding spring 2, and any shock being transmitted to the accelerator pedal 30 is reduced. In order to improve the response time of the acceleration slip control, the electromagnetic clutch is turned ON when the ignition is turned ON. The acceleration slip control can be executed simultaneously with the occurrence or detection of slip.

Hereinafter, the operation of the control system 200 will be described. Potentiometer 16 outputs a proportionally changing signal voltage to the control unit 34 in response to movement of the second input member 13. The control unit 34 determines the operational position of second input member 13 by the magnitude of the received signal voltage.

Further, the displacement range of the operational position of the second input member 13 in the constant speed running mode is stored in the control unit 34, and the control unit 34 detects whether or not the present operational position is within said displacement range. When the constant speed running mode is not operational and the second input member 13 is within the displacement range, the control unit 34 restricts the connection of the electromagnetic clutch. Conversely, if the second input member 13 is outside of the displacement range during a time other than the constant speed running mode, the control unit 34 permits the connection of the electromagnetic clutch.

That is to say, the control unit 34 restricts the rotation of motor in the direction of the throttle valve opening when in a state other than the constant speed running mode and the second input member 13 is within the displacement range.

Figure 1:
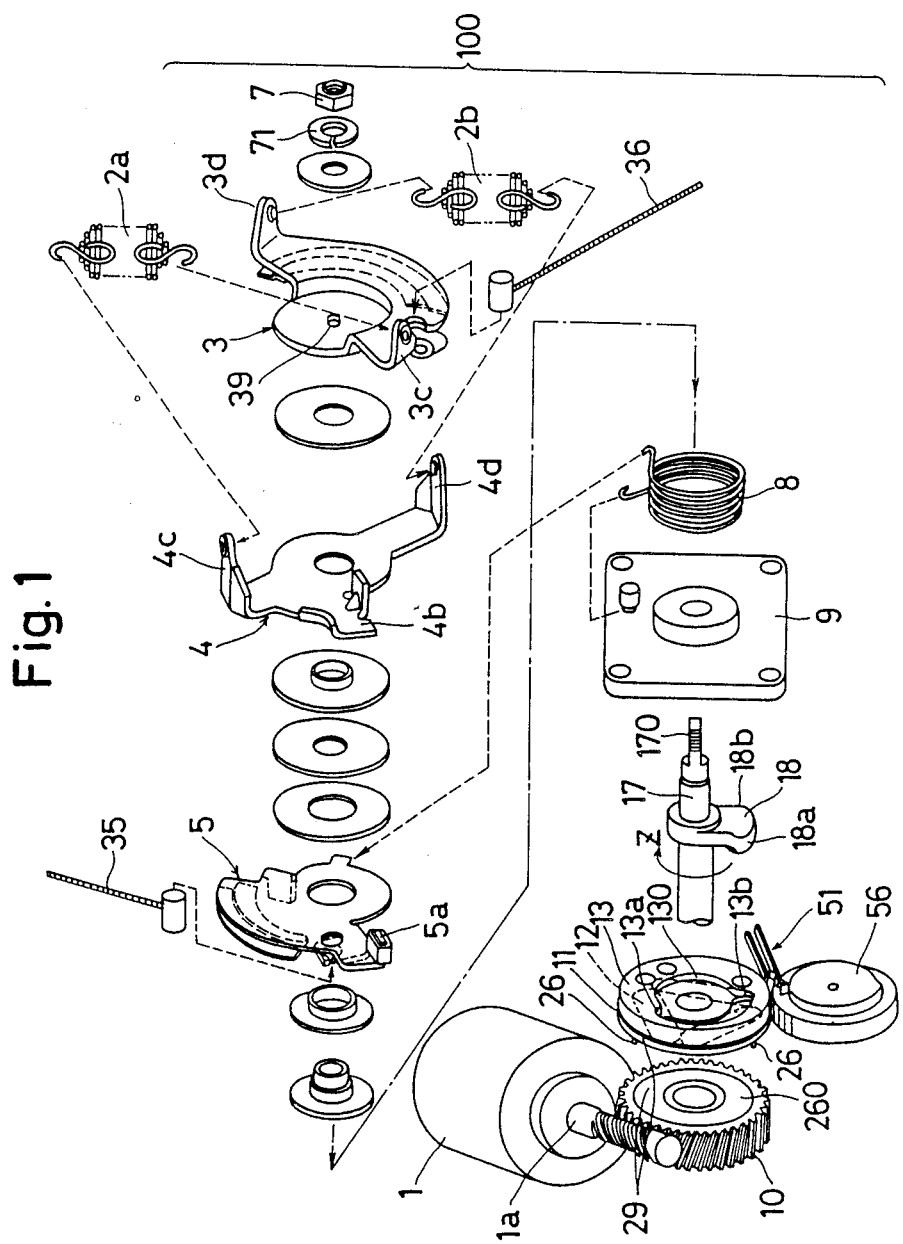
FIG. 1 is an exploded view of the throttle control mechanism for a part of throttle control system of a second embodiment of the present invention.
Figure 2:
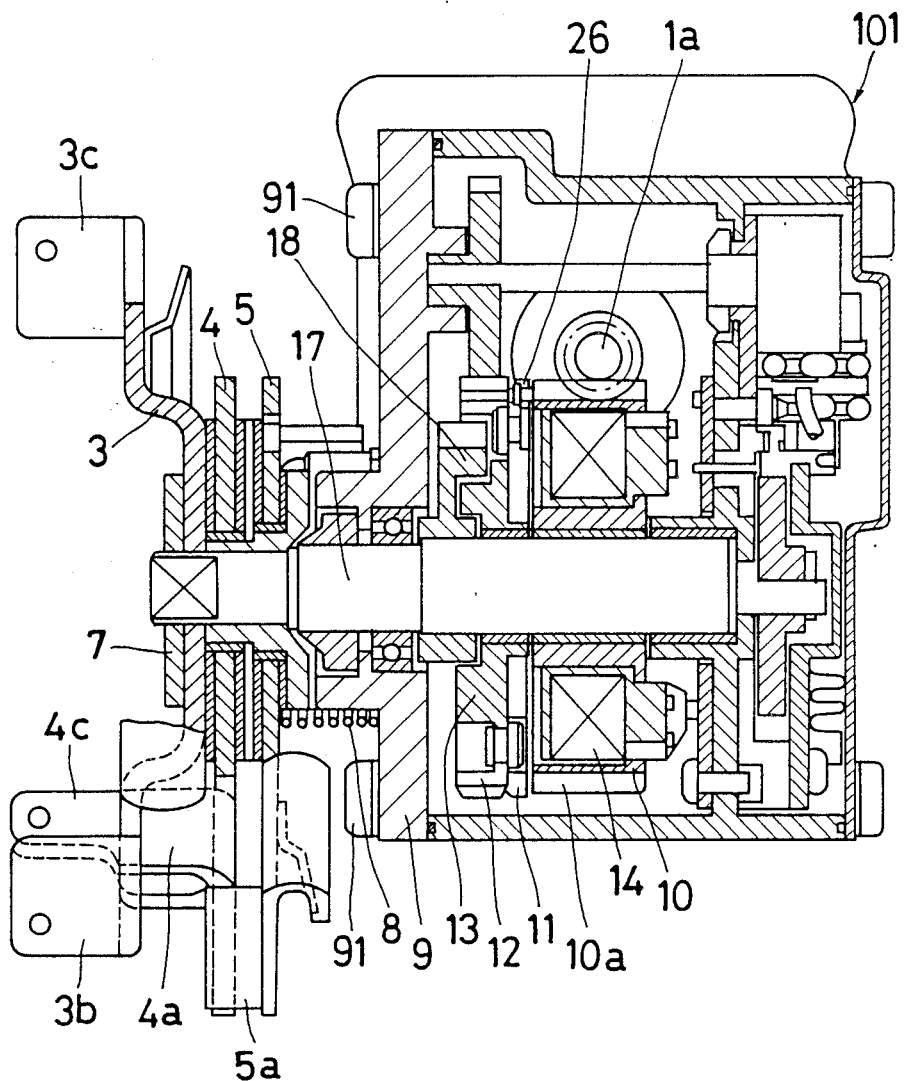
FIG. 2 is a cross-sectional view of the throttle control mechanism of FIG. 1.
Figure 3:
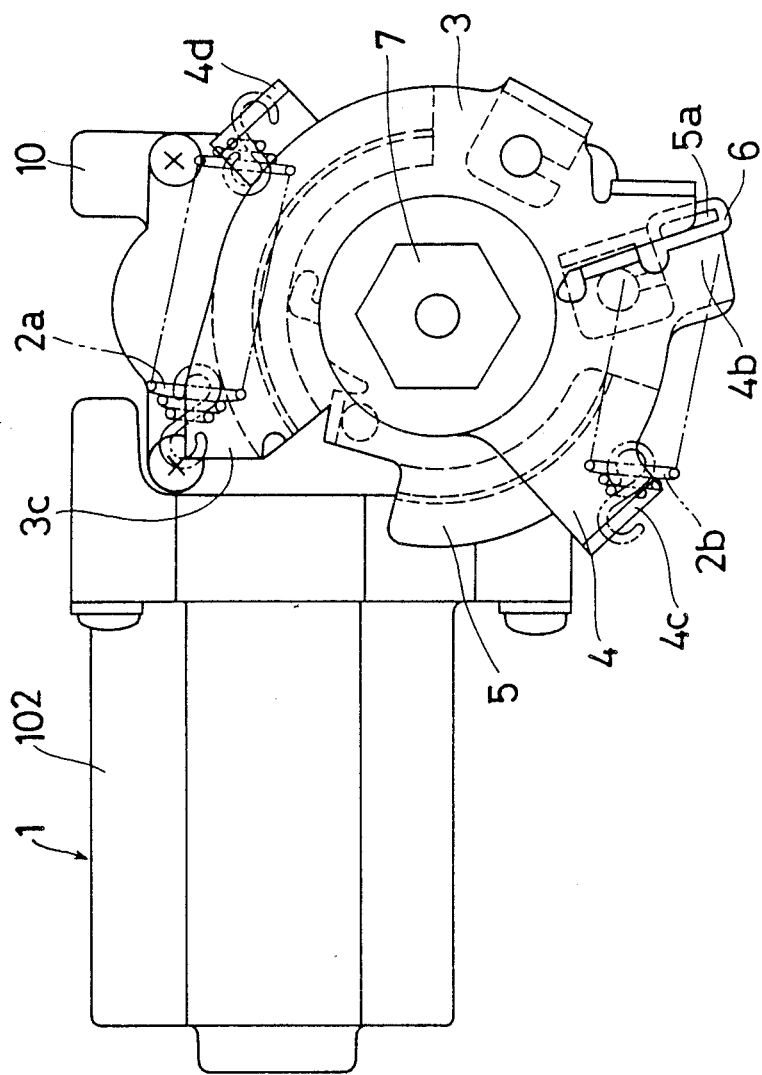
FIG. 3 is a front elevation view of the mechanism of FIG. 2.
Figure 4:
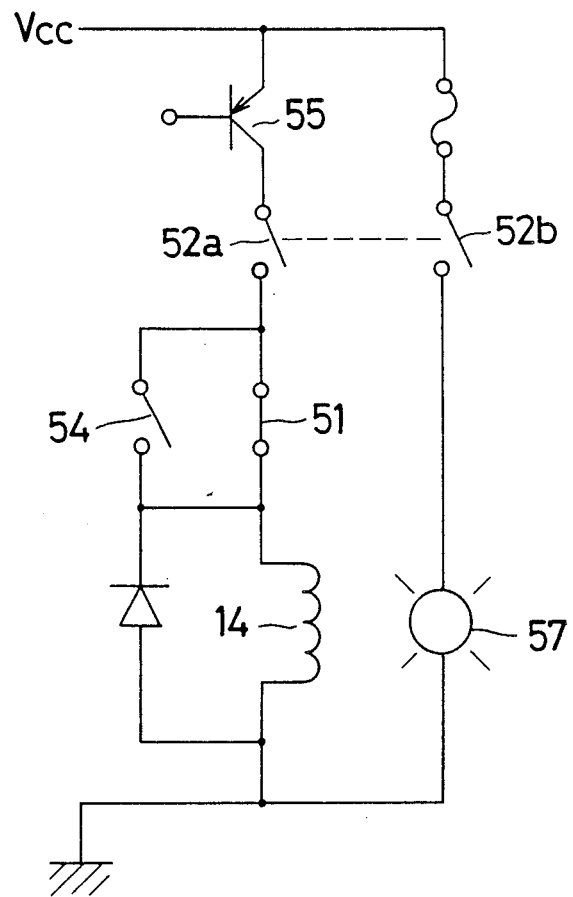
FIG. 4 is a diagram showing a control circuit of the throttle control system of the second embodiment.

The throttle control mechanism 100 for another embodiment of the throttle control system of the present invention is shown in FIGS. 1 to 3, and its control system is shown in FIG. 4. Detailed structure of this throttle control mechanism 100 will be explained with reference to FIGS. 1 to 3.

This throttle control mechanism includes basically the same function and structure of FIG. 5, and it is structured with a disc-like plate for reciprocating each member 3, 4, 5, 13. However, the control system of this embodiment is substantially the same as the control system of FIG. 1. A cam 56 and limit switch 51 are provided instead of the potentiometer 16.

Explaining the throttle control system of this pivot support reciprocating type in detail with regard to FIG. 1, a rotary shaft 1a of the motor 1 is meshed with the worm wheel 10, and an electromagnetic coil means 260 of the electromagnetic clutch 29 is contained within the interior of the worm wheel 10. Clutch plate 11 of electromagnetic clutch 29 is provided at a side portion of the worm wheel 10.

A plurality of pins 26 extend or protrude from the disc-like clutch plate 11 facing toward the worm wheel 10. A second input member 13 of disc shape is connected to the clutch plate 11 through a plurality of leaf springs 12. A guide recess 130 is formed radially interiorly of the member 13. Shoulder means 13a, 13b are provided symmetrically around the axis of the guide recess 130.

A central portion of the worm wheel 10, clutch plate 11 and second input member 13 are provided with concentric openings. An output shaft 17 is rotatably received therein and the worm wheel 10, clutch plate 11 and second input member 13 are reciprocally connected thereto. The output shaft 17 is supported by bearing means and the like in cover 9 and key member 18 is welded to a central portion of the output shaft 17. Surfaces 18a, 18b are engageable with the coupling shoulders 13a, 13b of the second input member 13 and are formed on opposite sides of the key member 18. Therefore, when the second input member 13 is reciprocated clockwise Z, the coupling shoulder 13b abuts with the coupling surface 18b, and the output shaft is reciprocated clockwise Z. Conversely, when the second input member 13 is reciprocated counterclockwise, the coupling shoulder 13a and the coupling surface 18a abut each other and the output shaft 17 is reciprocated counterclockwise.

The input member 5 and the intermediate member 4 are provided with central openings so as to receive the output shaft 17. Various spacing rings are interposed therebetween. A rectangular end portion 170 of the shaft 17 is provided with threads and is coupled with rectangular center hole 39 of the output member 3 and secured thereto by washer 71 and nut 7.

The input member 5 is provided with a protrusion 5a of substantially L-shape and is connected reciprocally to the output shaft 17. An end portion of wire 35 extends from the accelerator pedal 30 and is coupled to the input member 5. A return spring 8, for returning the accelerator pedal, is inserted about the output shaft 17 and is coupled to the member 5. Its other end is coupled to the cover 9.

An intermediate member 4 is formed with substantially symmetrical L-shaped protrusions 4c, 4d and another protrusion 4b. The member 4 is reciprocally connected to the output shaft 17 so as to be able to reciprocate between the input member 5 and the output member 3. The protrusion 4b is in abutting engagement with the protrusion 5a. Each of the ends of the springs 2a and 2b are coupled between the protrusions 4c, 4d and the output member 3.

The output member 3 is formed with protrusions 3c, 3d of substantially L-shape and which are bent in same direction as the protrusions 4c, 4d of the intermediate member 4. An end of the wire 36 is coupled on the circumference of the output member 3 and the other end of the wire 36 is connected to the throttle valve 31.

Further, the arrangement of each of the members of the throttle mechanism 100 is shown in FIGS. 2 and 3, as explained in detail hereinafter.

Frame 102 of the motor 1 is connected to the housing 101 and the cover 9 is connected to a side cover of the housing 101 by fastener 91. The output shaft 17 is mounted in the housing by bearing inserts. The input member 5, intermediate member 4, output member 3 extend, in that order, from near the cover 9 exteriorly of the housing 101. Key member 18 extends interiorly of the housing 101 from near the cover 9 and is received in second input member 13. Clutch plate 11 is fixed to the second input member 13.

The output shaft 17 is rotatably received in the center hole or opening of the worm wheel 10 as is mounted within the interior of the housing 101 so as to be reciprocated thereby.

The worm wheel 10 has teeth 10a engaging with the rotary shaft 1a of the motor 1. The worm wheel serves as part of the electromagnetic clutch 29 and the coil 14 is fixed to the interior of the wheel. Accordingly, a side portion of the worm wheel confronts the clutch plate 11 and is capable of being connected thereto. The clutch plate II is separated from the worm wheel 10 by the leaf spring 12, and only when power is transmitted to the coil 14 does the clutch plate 11 overcome the urging force of the leaf spring 12 so as to be connected to the worm wheel.

A cam 56 engages with the circumferential surface of the second input member 13. A limit switch is mounted so as to be in contact with the cam surface of cam 56. The limit switch 51 is part of the hereinafter described control system 200. The operation of the throttle mechanism 100 shown in FIGS. 2 and 3 will be described in detail.

When the coil 14 is not energized, the clutch plate 11 is not connected for movement with worm wheel 10. In this case, when the accelerator pedal 30 is depressed, the input member 5 reciprocates clockwise in the Z direction of FIG. 1, through the wire 35, and the protrusion 5a abuts and urges the protrusion 4b to reciprocate the intermediate member 4 clockwise. Since the intermediate member 4 is connected with the output member 3 through the springs 2a, 2b, the output member 3 opens the throttle valve 31 through movement of the wire 36. When the accelerator pedal 30 is returned, the return spring 8 reciprocates the input member 5 counterclockwise and the returning spring (not shown) of the throttle valve 31 reciprocates the output member 3 and the intermediate member 4 counterclockwise.

During this operation, i.e., an accelerator control mode of operation, the key member 18 of the output shaft 17 is not engaging with the coupling shoulders 13a, 13b formed on the second input member 13. As a result, regardless of ON/OFF status of the electromagnetic clutch 29, the second input member 13 does not influence rotation of the output shaft 17 and the output member 3 integral therewith.

In the acceleration slip control mode and the constant speed running mode, the coil 14 of the electromagnetic clutch is energized and the clutch plate 11 and the second input member 13 are connected to the worm wheel 10.

In the acceleration slip control mode, when the vehicle speed sensor 33 detects wheel slipping, the control unit 34 drives the motor 1, the second input member 13 reciprocates counterclockwise and the coupling shoulder 13a abuts the abutting surface 18a of the key member 18 and reciprocates the output member 3 counterclockwise to extend the springs 2a, 2b and control the throttle valve 31 to the closing direction, thereby decreasing the engine torque and suppressing the wheel slippage. After the slippage has decreased below a predetermined value, the degree of throttle opening is determined by the slipping ratio of the driven wheel and the driving wheel and becomes the predetermined value by the signal from the throttle sensor 32.

In the constant speed running mode, the second input member 13 is rotated in the clockwise direction Z shown in FIG. 1. The coupling shoulder 13b abuts the abutting surface 18b of the key member 18, the output member 3 is then rotated clockwise and the throttle valve 31 is controlled through the wire 36. The degree of throttle operation is calculated from the difference between the vehicle speed (predetermined vehicle speed) during constant speed running and the detected actual vehicle speed. The throttle opening degree is controlled by the signal of the throttle sensor 32 feeding back the degree of throttle opening. At this time, when a driver is not stepping on or depressing the accelerator pedal, the protrusion 5a and the protrusion 4b are separated from each other.

When an acceleration requirement occurs during the constant speed running mode, the protrusions 5a, 4b are abutted by depressing the accelerator and each of the members 3, 4 are reciprocated clockwise and the degree of throttle opening can be increased. At this time, since the key member 18 is operated within the space interval between the coupling shoulders 13a and 13b even if the electromagnetic clutch 29 is operable, interference between the motor 1 and the accelerator pedal 30 will not occur and the same operation with usual throttle operation is possible.

Hereinafter, the control circuit 300 will be described in detail with reference to FIG. 4.

One end of the coil 14 of the electromagnetic clutch is grounded and the other end is connected to a high potential power source Vcc through a normally opened relay contact point 54 which is connected in parallel with a normally closed limit switch 51, normally closed contact point 52a of a brake switch, and the transistor 55. The normally opened contact point 52b of the brake switch is connected in series with a fuse and brake lamp 57. Both ends are connected to the ground and high potential power source Vcc.

In operation of the control circuit 300, when the constant speed running mode is selected, the transistor 55 is turned on by the control unit 34 (FIG. 1) and the relay 54 is closed by a manual switch (not shown) for setting of the constant speed running mode. The coil 14 is energized and the electromagnetic clutch 29 is engaged. The cam 56 (FIG. 1) is provided such that the limit switch 51 is turned OFF within the operating region during the constant speed running mode and the limit switch 51 is turned ON when in other than the constant speed running mode. Accordingly, the limit switch is turned OFF during the constant speed running mode.

The limit switch 51 is closed during the acceleration slip control mode, and the transistor 55 is turned ON by the control unit 34 and the coil 14 is energized.

The limit switch is turned OFF during the acceleration slip control mode or normal running if the second input member 13 is reciprocated by electromagnetic wave hindrance or erroneous operation of control unit 34.

Accordingly, regardless of the state of operation of the transistor 55, the electromagnetic clutch 29 is released and the throttle valve 32 is opened.

As described above, in this embodiment, since the electromagnetic clutch 29 is interlocked by operation of limit switch 51 by cam 56, a simple structure is possible.

The cam surface may be formed on the circumferential surface of the second input member 13 instead of the arrangement of the cam 56 shown in FIG. 1.

In each embodiment described above, the constant speed running mode is detected and the opening operation of the throttle valve of the actuator has been restricted during a mode other than constant speed. It is not a departure from the present invention to detect the acceleration slip control mode and to restrict the throttle valve opening operation of the actuator during the acceleration slip control mode.

Since the throttle control system of the present invention is included with the control system for restricting the operation of the actuator to the throttle valve opening direction in the state other than the constant speed running mode, erroneous operation of the throttle valve can be prevented.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A throttle control system for a throttle valve of a vehicle having an accelerator control mode, a constant speed running mode and a slip control mode of operation, comprising:
    an output member for operating said throttle valve;
    accelerator-actuated means for driving said output member in said accelerator control mode;
    an actuator;
    power transmitting means interconnecting said actuator and said output member for transmitting power to said output member in both said constant speed running mode and said slip control mode, said power transmitting means including a first power transmitting element movable within a range of movement; and control means for sensing the position of said first power transmitting element within its range of movement and deactivating said power transmitting means when said first power transmitting element is sensed to be in a predetermined portion of its range of movement during modes of operation other than said constant speed running mode, so as to restrict the opening of the throttle in such mode of operation other than said constant speed running mode.

2. A throttle control system according to claim 1, wherein said power transmitting means comprises a single power train which transmits power from said actuator to said output member in both said constant speed running mode and said slip control mode.

3. A throttle control system according to claim 2, wherein said power train includes a two-way clutch for transmitting power from said actuator to said output member in both said constant speed running mode and said slip control mode, said control means being operably connected to said clutch for selectively engaging and disengaging said clutch.

4. A throttle control system according to claim 3, wherein said control means includes electrically operated means for displacing said clutch, an electrical switch for conducting electrical power to said electrically operated means, and means responsive to movement of said first power transmitting element for opening and closing said switch.

5. A throttle control system according to claim 4, wherein said control means further includes a cam operably connected to said first power transmitting element to be displaced thereby for operating said switch.

6. A throttle control system according to claim 4 including an additional switch for controlling the supply of electrical power to said electrically operated means during said constant speed running mode, said switch and said additional switch being independently operable.

7. A throttle control system according to claim 4, wherein said clutch comprises an electromagnetic clutch and said electrically operated means comprises an electric coil of said clutch.

* * * * *